(12) United States Patent
Machado et al.

(10) Patent No.: US 12,031,584 B2
(45) Date of Patent: Jul. 9, 2024

(54) SEALING DEVICE FOR A BEARING

(71) Applicant: SCHAEFFLER TECHNOLOGIES AG & CO. KG, Herzogenaurach (DE)

(72) Inventors: Elias Ferreira Machado, Sorocaba (BR); Felipe Travaioli Souza, Sorocaba (BR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 118 days.

(21) Appl. No.: 17/847,640

(22) Filed: Jun. 23, 2022

(65) Prior Publication Data

US 2023/0417287 A1 Dec. 28, 2023

(51) Int. Cl.
*F16C 33/78* (2006.01)

(52) U.S. Cl.
CPC ...... *F16C 33/7883* (2013.01); *F16C 33/7853* (2013.01)

(58) Field of Classification Search
CPC ............. F16C 33/782; F16C 33/7823; F16C 33/7853; F16C 33/7856; F16C 33/7869; F16C 33/7879; F16C 33/7883
See application file for complete search history.

(56) References Cited

U.S. PATENT DOCUMENTS

| | | | |
|---|---|---|---|
| 2,118,027 A | 5/1938 | Thomas | |
| 4,434,985 A * | 3/1984 | Sonnerat | F16J 15/40 277/402 |
| 5,431,413 A * | 7/1995 | Hajzler | F16C 33/7896 384/485 |
| 6,481,896 B1 | 11/2002 | Ohtsuki et al. | |
| 6,550,973 B2 * | 4/2003 | Yeo | F16C 33/7883 384/484 |
| 7,334,942 B2 * | 2/2008 | Cha | F16C 33/7813 384/480 |
| 9,956,820 B2 | 5/2018 | Gulli et al. | |
| 2003/0034614 A1 | 2/2003 | Ohtsuki et al. | |
| 2007/0090604 A1 * | 4/2007 | Shibayama | F16C 33/7883 277/349 |

FOREIGN PATENT DOCUMENTS

| | | | |
|---|---|---|---|
| DE | 102018122201 A1 | | 3/2020 |
| JP | 4735798 | * | 5/2011 |
| KR | 20120114819 | * | 10/2012 |

* cited by examiner

*Primary Examiner* — James Pilkington
(74) *Attorney, Agent, or Firm* — Volpe Koenig

(57) ABSTRACT

A sealing assembly for protecting a bearing from contamination is disclosed herein. The sealing assembly includes an annular insert having a cross-section including a radial arm and an axial arm configured to press against an inner bearing ring, an annular sealing member configured to be pressed against the annular insert, the annular sealing member having a cross-section including a first arm directed in an axial direction and a second arm directed in a radial direction, and at least one radially oriented lip extending from the first arm, and an annular shield configured to engage the annular sealing member and at least one of an inner bearing ring or an outer bearing ring.

7 Claims, 7 Drawing Sheets

SEALING DEVICE FOR A BEARING

FIELD OF INVENTION

The present disclosure generally relates to a sealing device for a bearing assembly for preventing debris or other contamination from entering the bearing, and more specifically to a sealing assembly including a multi-lipped annular sealing member.

BACKGROUND

Agricultural machines, such as planters and seeders, can suffer from contamination caking on the outer seals and getting inside the bearings of the wheels. The outer seals can also suffer from misalignment at installation, which can make it easier for contamination to get inside the bearings. This results in bearings not reaching the specified useful life and having to be replaced earlier than expected.

Conventional seals and sealing components have generally been considered satisfactory for their intended purpose. However, there is still a need in the art for improved bearing seals to further prevent contamination build up and penetration of the bearings. The present disclosure provides a solution for this need.

SUMMARY

A sealing assembly for protecting bearings from contamination is disclosed herein. The sealing assembly includes an annular insert having a cross-section including a radial arm and an axial arm configured to be placed against an inner portion of outer bearing ring. An annular sealing member is provided that is pressed against the annular insert, and the annular sealing member has a cross-section including a first arm configured to engage with the axial arm of the annular insert and a second arm configured to engage with the radial arm of the annular insert, and includes at least one radially oriented lip extending from the first arm. An annular shield is provided that engages with the at least one radially oriented lip of the first arm of the annular sealing member. The at least one radially oriented lip can include a second radially oriented lip contacting the annular shield at a second location.

The second arm of the annular sealing member can include another lip on a distal end thereof. The lip on the distal end of the annular sealing member can extend away from the axial arm of the annular sealing member.

Further, at least one radially oriented lip of the annular sealing member can at least partially define a concave or convex outer boundary of the annular sealing member. The outer boundary of the annular sealing member can include a plurality of protrusions configured to deflect contamination. The axial arm of the annular sealing member can also include an outer lip at least partially defining a radially outer boundary of the annular sealing member. The outer lip can be directed away from at least one of the radial lips of the axial arm.

It is also considered that the annular shield can include at least a first axial leg, a radial leg, and a second axial leg. The annular shield can include an inclined leg connecting the first axial leg and the radial leg. The annular shield can include a terminal leg attached to a terminal end of the first axial leg directed towards the annular sealing member directed in a radially inward direction and in an axially inward direction. The annular sealing member can include an axial lip extending from the second arm and contacting the terminal leg of the annular shield. The axial lip of the annular sealing member can form an angle of between 20 and 60 degrees, inclusive, with respect to an axial plane. The annular sealing member and the annular shield can define three relative contact points, which can define sealing interfaces and thereby improve the ability of the sealing assembly to prevent the ingress of debris to the bearing assembly.

A bearing assembly for a wheel is also disclosed. The bearing assembly includes an outer bearing ring, an inner bearing ring, and a sealing assembly having an annular insert having a cross-section including a radial arm and an axial arm pressed against the outer bearing ring, an annular sealing member pressed against the inner bearing ring and the outer bearing ring, and an annular shield configured to close off the assembly. The inner bearing ring can include a contact surface to engage with at least a portion of the annular sealing member and a stopper to provide an abutment surface for the annular shield. The annular shield includes an inclined surface connecting a first axial leg and a radial leg, and the annular sealing member contacts the inclined surface.

These and other features of the sealing assembly of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the assemblies of the subject disclosure without undue experimentation, embodiments thereof will be described in detail herein below with reference to certain figures, wherein.

DETAILED DESCRIPTION OF THE PREFERRED EMBODIMENTS

Figure 1:
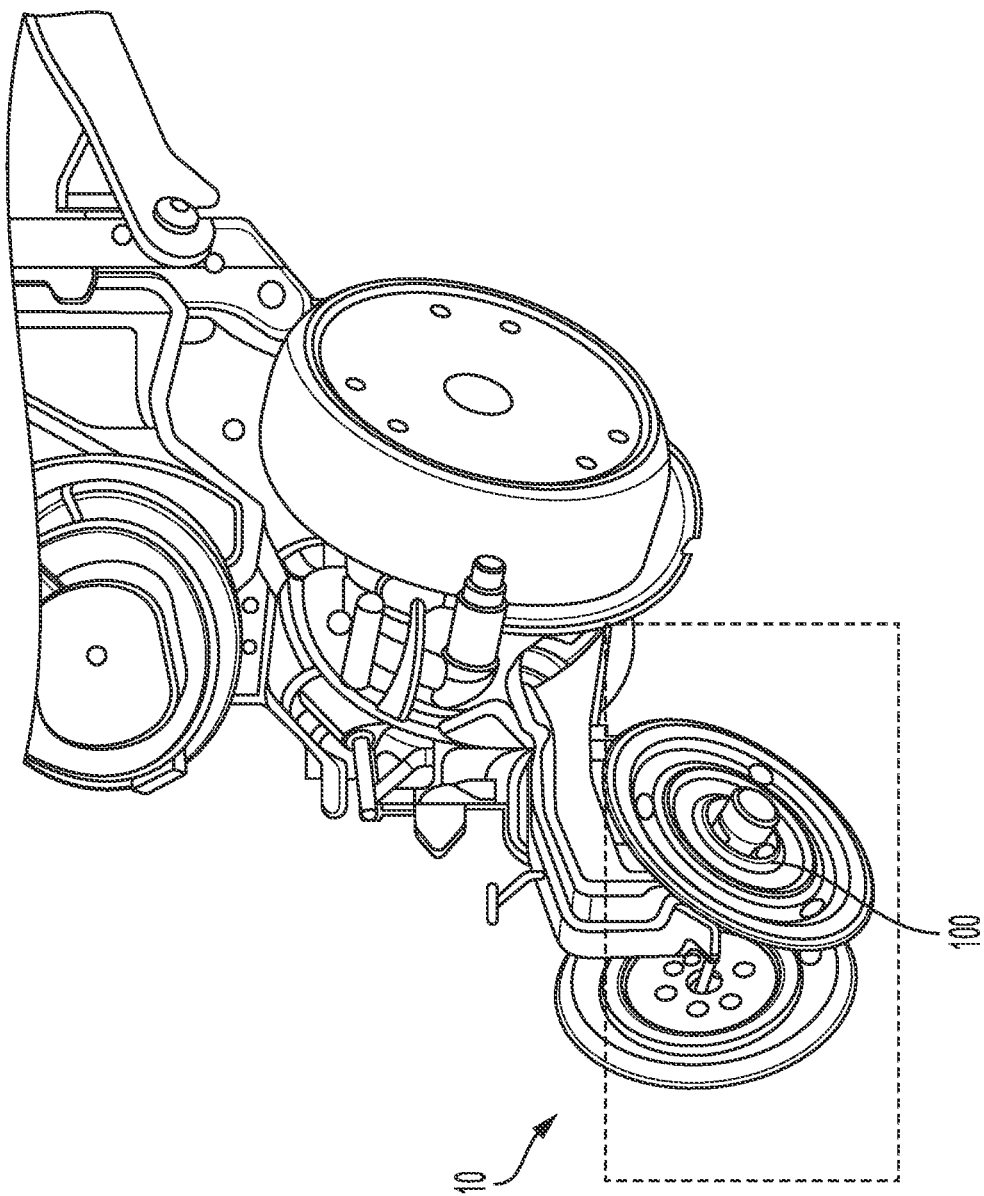
FIG. 1 is a system view of an exemplary embodiment of a sealing assembly on a wheel of a vehicle.

Reference will now be made to the drawings wherein like reference numerals identify similar structural features or aspects of the subject disclosure. For purposes of explanation and illustration, and not limitation, a system view of an exemplary embodiment of the sealing assembly in accordance with the disclosure is shown in FIG. 1 and is designated generally by reference character 100. Other embodiments of the sealing assembly in accordance with the disclosure, or aspects thereof, are provided in FIGS. 2A-4B, as will be described. The sealing assemblies described herein can be used to further prevent contamination build up and penetration of the bearing systems on vehicle wheels, and farming wheels specifically by improving sealing interfaces and ensuring alignment during and after installation.

FIG. 1 shows a wheel 10, which can be utilized on a vehicle such as farming equipment, off-road vehicle, or any off-highway vehicle which regularly encounters dirt, debris, and other potential contaminants. The wheel 10 includes a sealing assembly 100, which prevents the aforementioned debris and dirt from entering the bearings and reducing their useful life. Embodiments of the sealing assembly 100 will be shown and described in detail in FIGS. 2A-4B.

Figure 2A:
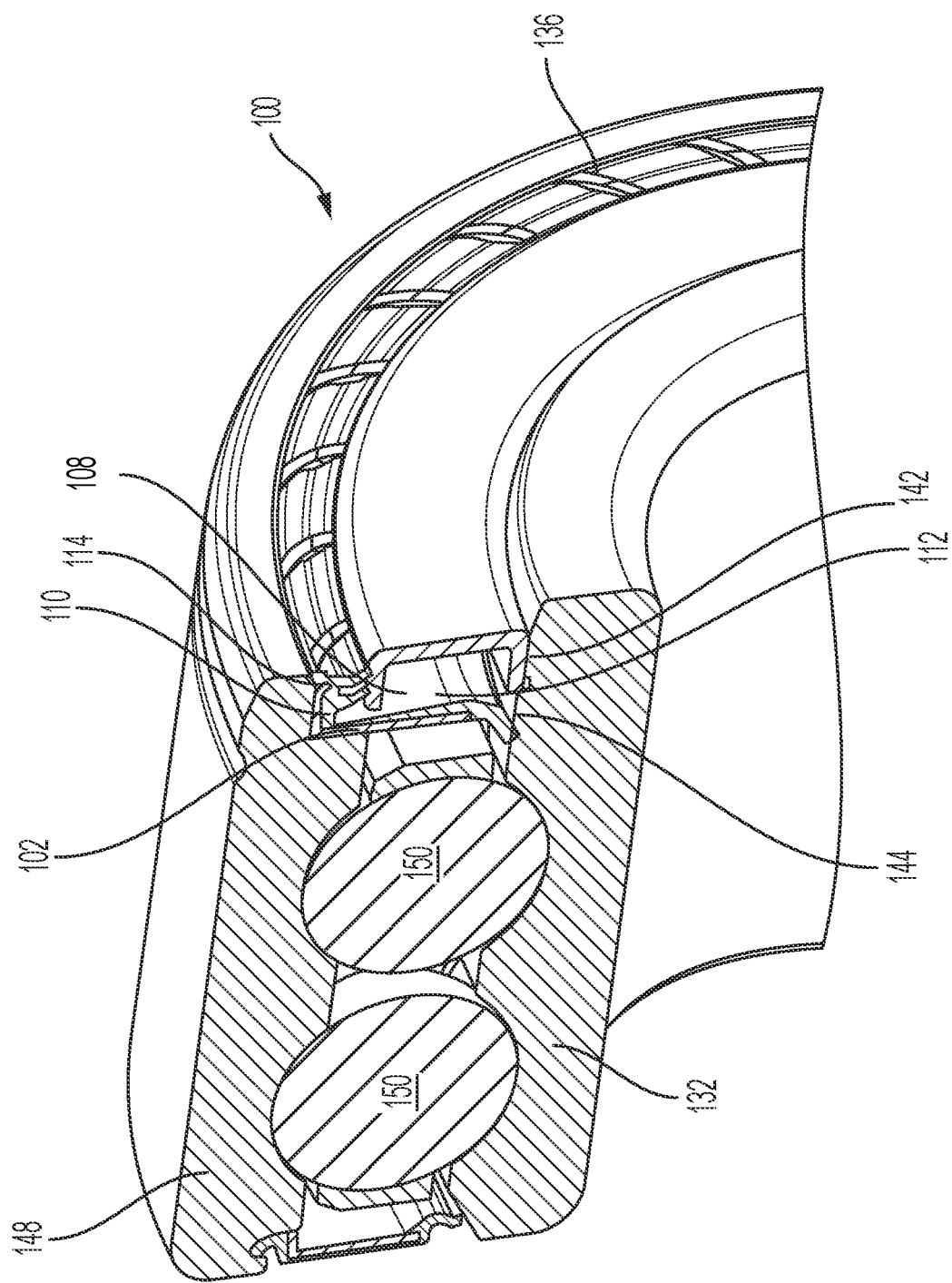
FIG. 2A is a perspective view of an exemplary embodiment of the sealing assembly of FIG. 1, showing a sealing member with a concave axially outer boundary.
Figure 2B:
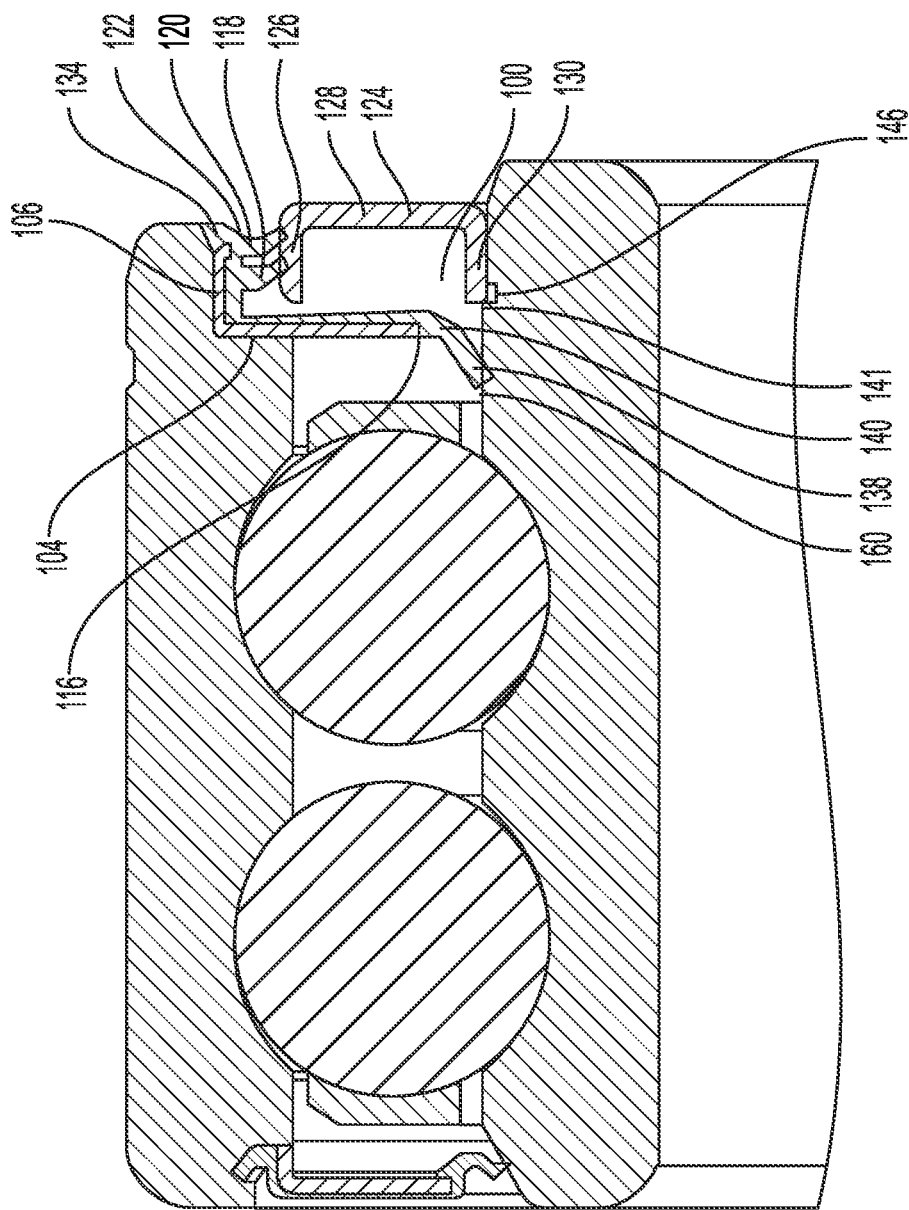
FIG. 2B is a cross-sectional view of the embodiment of FIG. 2A.

FIG. 2A shows a sealing assembly 100 used in FIG. 1 in perspective, while FIG. 2B shows a cross-sectional view of the same embodiment. The sealing assembly 100 sits on an axially outer edge of an inner bearing ring 132 and an outer bearing ring 148 and protects the rolling elements 150 from contamination. The sealing assembly 100 includes an annular insert 102 which has an L-shaped cross-section. The cross-section includes a radial arm 104 connected to an axial arm 106. The annular insert 102, which is metallic, and can be made of sheet metal, or other similar material, is pressed against the outer bearing ring 148 by an interference fit. The annular insert 102 helps reinforce the sealing assembly 100 and allow a proper alignment into the outer bearing ring 148 after assembly. An annular sealing member 108 is pressed against the annular insert 102 and contacts both the inner bearing ring 132 and the outer bearing ring 148. The annular sealing member 108 can be an elastic component, and can be made of an elastomer material such as acrylonitrile butadiene rubber, hydrogenated acrylonitrile butadiene rubber, or a fluorocarbon-based fluoroelastomer. The annular sealing member 108 is defined by a cross-section that includes a first arm 110 which extends in a generally axial direction and engages the axial arm 106 of the annular insert 102 and partially wraps around and envelops the axial arm 106 at a distal end 114 thereof, and a second arm 112 that extends generally along a radial direction which engages with the radial arm 104 of the annular insert 102, and partially wraps around and envelops the radial arm 104 at a distal end 116 thereof. The annular insert 102 and the annular sealing member 108 can be bonded together during an injection molding process used to produce the combination of the annular insert 102 and the annular sealing member 108. In this manner, the annular insert 102 and the annular sealing member 108 can be provided in a combined assembly. The annular sealing member 108 can include sealing lips or flanges that are configured to define a seal against an opposing element, such as an annular shield 124, the inner bearing ring 132 and the outer bearing ring 148, which is described in more detail herein.

In one example, the first arm 110 can include a first radially oriented lip 118 and a second radially oriented lip 120 each extending radially inwardly. The second radially oriented lip 120 can partially define an axially outer boundary 122 of the annular sealing member 108, and can be located axially outward relative to the first radially oriented lip 118. As used in this manner, the term axially outer boundary 122 refers to an axially outermost portion or region of the annular sealing member 108. The annular sealing member 108 can also include a third radially oriented lip 134 extending away from the second radially oriented lip 120. As shown in FIG. 2B, the second radially oriented lip 120 and the third radially oriented lip 134 can combine to define an entirety of the axially outer boundary 122. The second radially oriented lip 120 and the third radially oriented lip 134 define a concave, i.e. bending axially inward, outer boundary 122, with the third radially oriented lip 134 pressing against the outer bearing ring 148 and the second radially oriented lip pressing against a first axial leg 126 of the annular shield 124.

The axially outer boundary 122 can include a plurality of circumferentially spaced apart protrusions 136. The protrusions 136 can be configured to deflect the dirt and debris, and also decrease the chance of dirt caking on the outer boundary 122 of the annular sealing member 108 and the rest of the sealing assembly 100. The protrusions 136 can be formed as fins, which are be slanted in a direction of rotation of the wheel. The protrusions 136 can be evenly spaced about the outer boundary 122 of the annular sealing member 108. The protrusions 136 can be oriented in a non-radial direction such that the protrusions 136 are slanted. The protrusions 136 can have a volute shape that help expel water and other liquids from the area. However, one of ordinary skill in the art will understand that the protrusions 136 can be formed as dimples, cantilevered lips, or any other similar shapes that can be capable of flinging debris or other contaminants from the assembly.

Referring further to FIGS. 2A and 2B, the second arm 112 of the annular sealing member 108 can also include a fourth radially oriented lip 138 on a distal end 140 thereof, in the general area of the distal end 116 of the second arm 112 extending inward pressing against a contact surface 160 of the inner bearing ring 132 to define a sealing interface. In one example, the fourth radially oriented lip 138 can extend axially inward and radially inward, such that the fourth radially oriented lip 138 has a slanted or diagonal direction, and extends axially inward beyond the distal end 116 of the radial arm 104 of the annular insert 102.

The sealing assembly 100 also includes an annular shield 124. The annular shield 124, which can be made of sheet metal or stainless steel, can be defined by a cross-section having a first axial leg 126, a radial leg 128, and a second axial leg 130. In one example, the annular shield 124 can have a "C" shaped profile. The first radially oriented lip 118 and the second radially oriented lip 120 of the annular sealing member 108 can be configured to press against the first axial leg 126 of the annular shield 124. The second axial leg 130 can be configured to be pressed against the inner bearing ring 132.

The inner bearing ring 132 can include a contact surface 160 to engage with the fourth radially oriented lip 138 of the annular sealing member 108 and a stopper 141 to provide an abutment surface for the annular shield 124. The stopper 141 configured to prevent the annular shield 124 from moving axially inward in the bearing. The stopper 141 can be configured as an axial abutment surface that is configured to engage with the annular shield 124. The stopper 141 can include a first axial surface 142 and a second axial surface 144 that is defined axially inward of the first axial surface 142. The first axial surface 142 and the second axial surface 144 can be oriented along two different axial planes and can be separated in an axial direction by a gutter 146. Stated differently, the second axial surface 144 can have a larger diameter than a diameter of the first axial surface 142. The second axial surface 142 and the contact surface 160 can be oriented along the same axial plane. The gutter 146, which can be formed as a groove, is configured to ensure that the second axial leg 130 of the annular shield 124 is flush against the stopper 141, instead of pressing up against an otherwise sloped connecting surface that would be required between the varying diameters defined by the first axial surface 142 and the second axial surface 144.

Figure 3A:
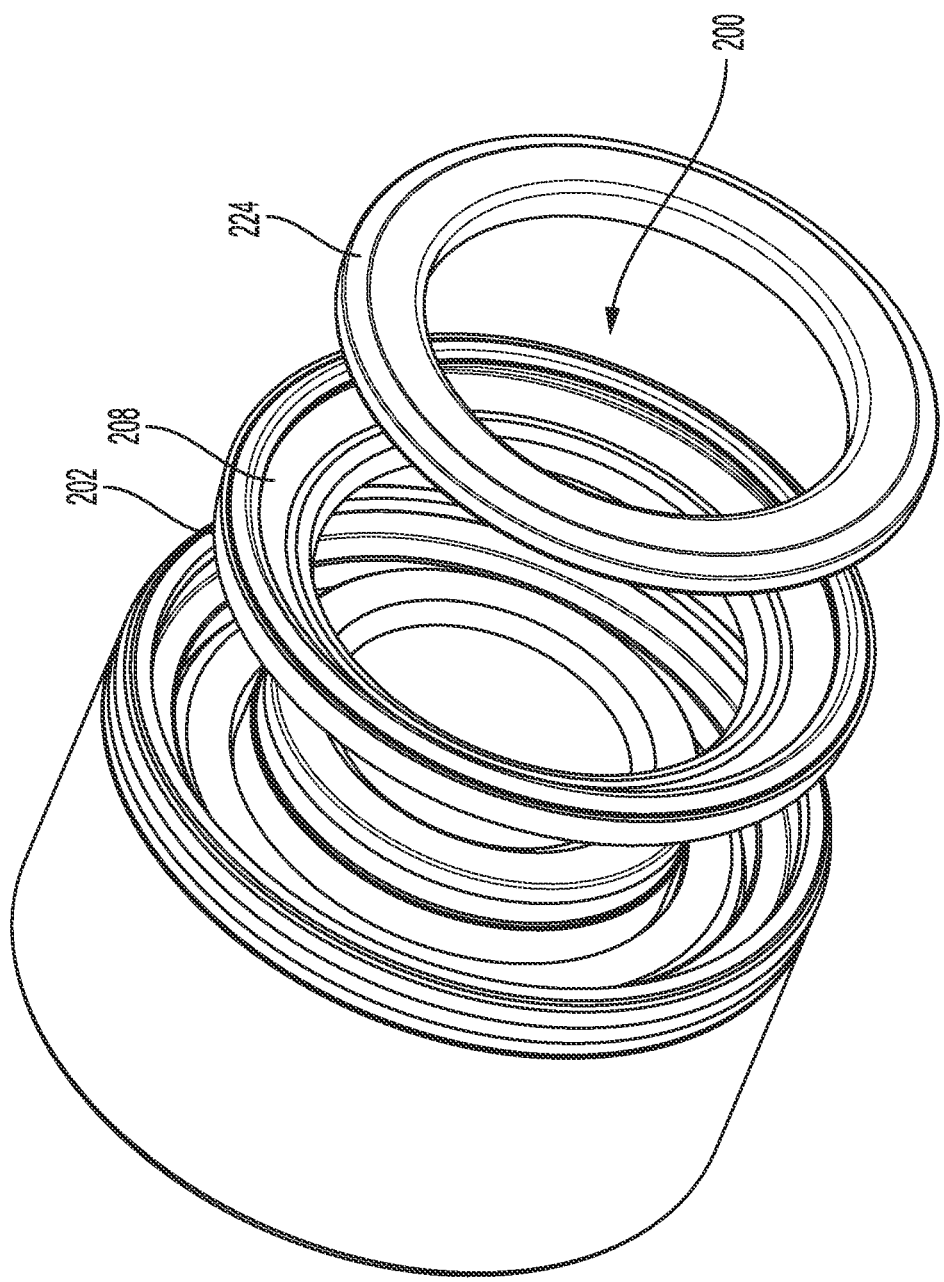
FIG. 3A is a perspective view of a sealing assembly of FIG. 1, with a sealing member with a partially convex and partially concave axially outer boundary.
Figure 3B:
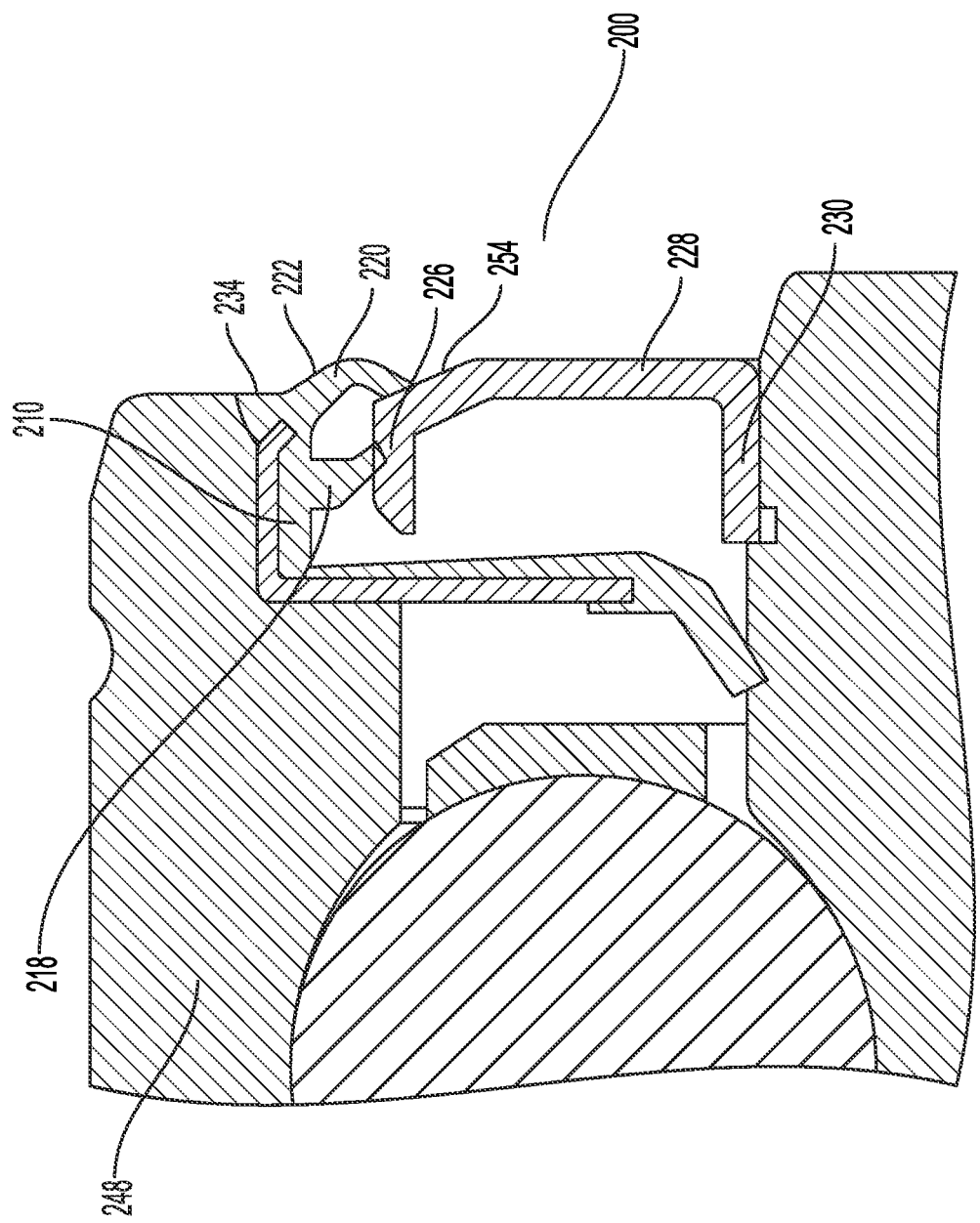
FIG. 3B is a cross-sectional view of the embodiment of FIG. 3A.

FIG. 3A is a perspective view of another sealing assembly, with a convex outer edge and FIG. 3B shows a cross-sectional view of the embodiment. The sealing assembly 200 shown here includes an annular shield 224, an annular sealing member 208, and an annular insert 202, as in the previously described embodiment. Additionally, the annular shield 224 includes a first axial leg 226, a radial leg 228, a second axial leg 230, and an inclined leg 254 connecting the first axial leg 226 and the radial leg 228. The first arm 210 of the annular sealing member 208 includes a first radially oriented lip 218 and a second radially oriented lip 220 each extending radially inwardly. The second radially oriented lip 220 can partially define the axially outer boundary 222 of the annular sealing member 208. The second radially oriented lip 220 and a third radially oriented lip 234 can define the outer boundary 222 with the boundary having both at least one concave portion and at least one convex portion. For example, a convex portion can be defined in a portion of the annular sealing member 208 that is directly radially outward from the annular shield 224, while a concave portion can be defined in a portion of the annular sealing member 208 that is defined directly radially inward from the outer bearing ring 248. The third radially oriented lip 234 can abut the outer bearing ring 248 and the second radially oriented lip 220 can abut the inclined leg 254 of the annular shield 224 and protrude outwardly to partially define a convex profile for the axially outer boundary 222 while the third radially oriented lip 234 which extends away from the second radially oriented lip 220 defines the concave portion of the outer boundary 222.

Figure 4A:
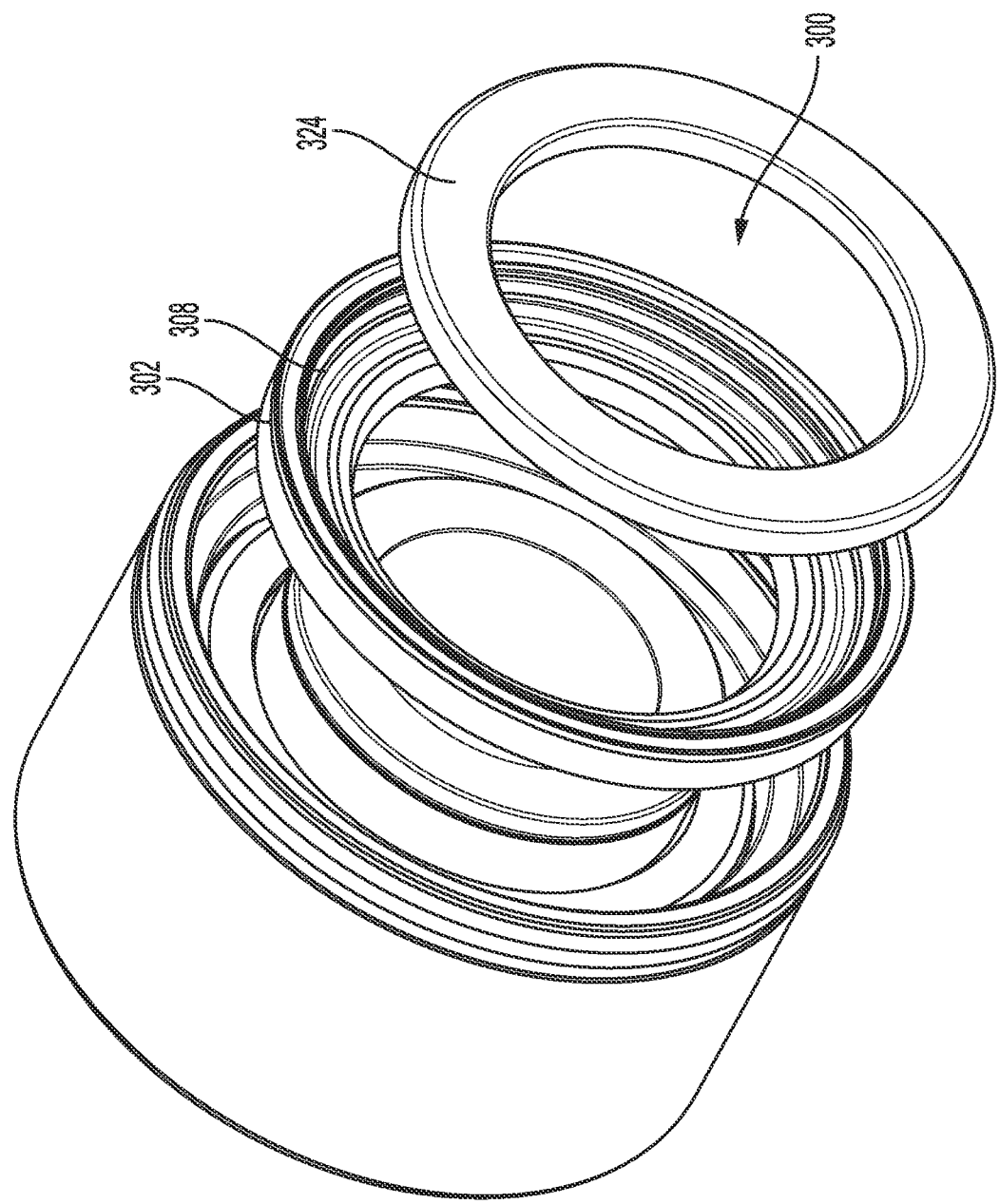
FIG. 4A is a perspective view of a sealing assembly of FIG. 1, with a sealing member with three inner lips.
Figure 4B:
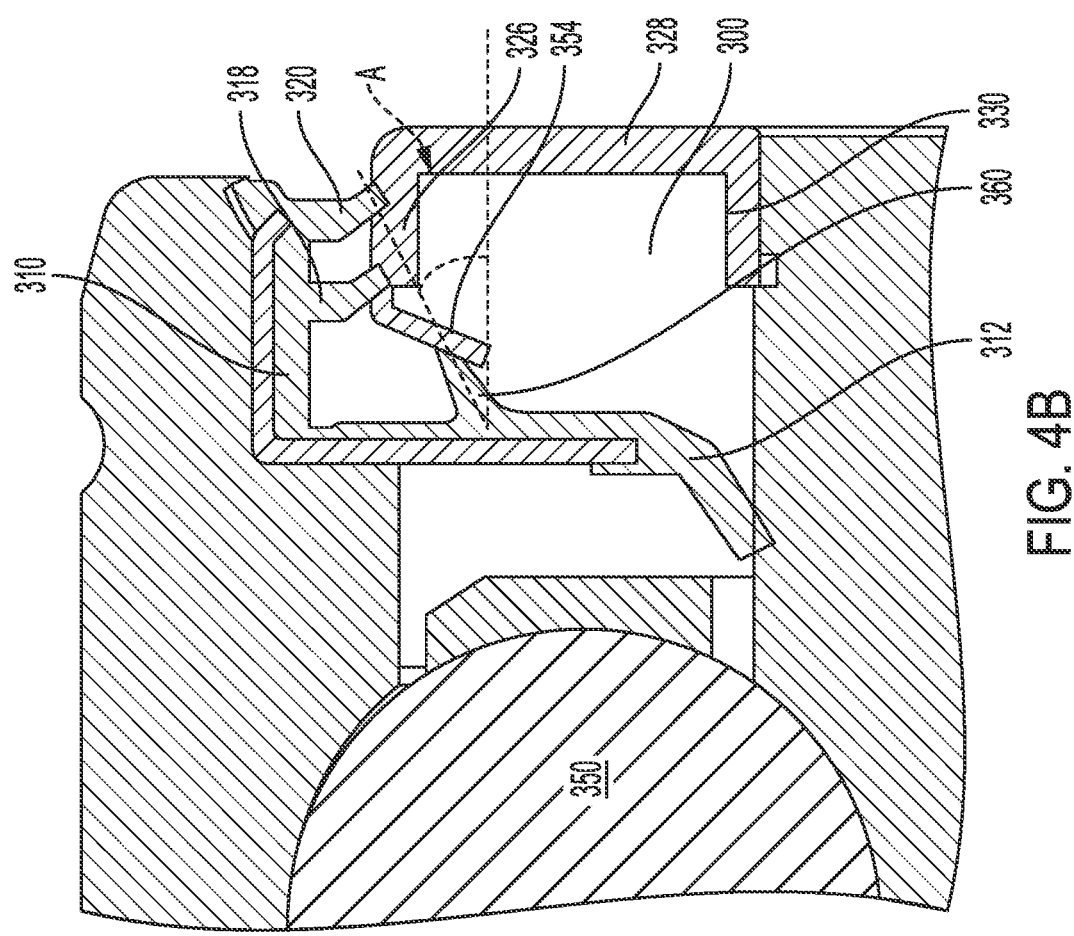
FIG. 4B is a cross-sectional view of the embodiment of FIG. 4A.

Referring to FIG. 4A, a perspective view of another embodiment of a sealing assembly with three inner lips is shown, while FIG. 4B shows a cross-sectional view of the embodiment of FIG. 4A. The sealing assembly 300 shown here includes an annular shield 324, an annular sealing member 308, and an annular insert 302, as in the previously described embodiments. Additionally, the annular shield 324 includes a first axial leg 326, a radial leg 328, a second axial leg 330, and an inclined leg 354 projecting from the first axial leg 326 radially inward towards the rolling elements 350. A first arm 310 of the annular sealing member 308 includes a first radially oriented lip 318 and a second radially oriented lip 320 extending inwardly, where both the first radially oriented lip 318 and the second radially oriented lip 320 abut the first axial leg 326 of the annular shield 324. A second arm 312 of the annular sealing member 308 also includes an axial lip 360 extending towards and contacting the inclined leg 354 of the annular shield 324. The axial lip 360 of the annular sealing member 308 can form an angle (A) of between 0 and 60 degrees with respect to an axial plane. One of ordinary skill in the art would understand that the angle of the axial lip 360 can vary. For example, in one configuration, the axial lip 360 can extend 90 degrees from the second arm 312.

The various combinations of the sealing lips, the annular shield, the annular insert, and the stopper mentioned above result in a more secure seal assembly and a decreased risk of misalignment at installation that further prevent the possibility of debris, water, or other contaminants from entering the bearings and reducing their useful life. While the seal assemblies of the subject disclosure have been shown and described with reference to preferred embodiments, those skilled in the art will readily appreciate that changes and/or modifications may be made thereto without departing from the scope of the subject disclosure.

LOG OF REFERENCE NUMERALS wheel 10
sealing assembly 100
annular insert 102
insert radial arm 104
insert axial arm 106
annular sealing member 108
sealing member first arm 110
sealing member second arm 112
sealing member first arm distal end 114
sealing member second arm distal end 116
sealing member first radially oriented lip 118
sealing member second radially oriented lip 120
sealing member outer boundary 122
annular shield 124
annular shield first axial leg 126
annular shield radial leg 128
annular shield second axial leg 130
inner bearing ring 132
third radially oriented lip 134
protrusions 136
fourth radially oriented lip 138
second arm distal end 140
stopper 141
first axial surface 142
second axial surface 144
gutter 146
outer bearing ring 148
rolling elements 150
sealing assembly 200
annular insert 202
sealing member 208
first arm 210
sealing member first arm 210
sealing member second arm 212
sealing member first radially oriented lip 218
sealing member second radially oriented lip 220
sealing member outer boundary 222
annular shield 224
annular shield first axial leg 226
annular shield radial leg 228
annular shield second axial leg 230
sealing member third radially oriented lip 234
sealing member fourth lip 238
outer bearing ring 248
annular shield inclined leg 254
sealing assembly 300
annular insert 302
sealing member 308
sealing member first arm 310
sealing member second arm 312
sealing member first radially oriented lip 318
sealing member second radially oriented lip 320
annular shield 324
annular shield first axial leg 326
annular shield radial leg 328
annular shield second axial leg 330
rolling elements 350
annular shield inclined leg 354
annular sealing member second arm axial lip 360

What is claimed is:

1. A sealing assembly for protecting a bearing from contamination, the sealing assembly comprising:
   an annular insert having a cross-section including a radial arm and an axial arm configured to press against an outer bearing ring;
   an annular sealing member being co-molded to the annular insert, the annular sealing member having a cross-section including a first arm directed in an axial direction and a second arm directed in a radial direction, and at least one radially oriented lip extending from the first arm; and an annular shield configured to engage the annular sealing member and an inner bearing ring;

wherein an axially outer boundary of the annular sealing member includes a plurality of protrusions configured to deflect contamination.

2. The sealing assembly of claim 1, further comprising a second radially oriented lip of the annular sealing member that is directed radially away from the at least one radially oriented lip and is configured to engage the outer bearing ring.

3. A bearing assembly comprising:

an outer bearing ring;

an inner bearing ring;

a sealing assembly including an annular insert having a cross-section including a radial arm and an axial arm configured to press against the outer bearing ring;

an annular sealing member attached to the annular insert; and an annular shield configured to engage at least a portion of the annular sealing member;

wherein the inner bearing ring includes a contact surface configured to engage with at least a portion of the annular sealing member and a stopper configured to provide an abutment surface for the annular shield;

wherein the annular shield includes an inclined surface connecting a first axial leg and a radial leg, and the annular sealing member contacts the inclined surface.

4. The bearing assembly of claim 3, wherein the annular shield includes at least the first axial leg, the radial leg, and a second axial leg.

5. The bearing assembly of claim 3, wherein the axial lip of the annular sealing member forms an angle of between 20 degrees and 60 degrees, inclusive, with respect to an axial plane.

6. The bearing assembly of claim 3, wherein the annular sealing member is in contact with the inner bearing ring and the outer bearing ring.

7. The bearing assembly of claim 3, wherein the annular sealing member and the annular shield define three distinct contact sealing interfaces.

* * * * *